United States Patent [19]

Ooe et al.

[11] Patent Number: 5,018,824

[45] Date of Patent: May 28, 1991

[54] PROCESS FOR FUSION-SPLICING HERMETICALLY COATED OPTICAL FIBERS

[75] Inventors: Masaharu Ooe; Yoichi Ishiguro; Gotaro Tanaka, all of Yokohama, Japan

[73] Assignee: Sumitomo Electric Industries, Ltd., Osaka, Japan

[21] Appl. No.: 409,714

[22] Filed: Sep. 20, 1989

[30] Foreign Application Priority Data

Sep. 24, 1988 [JP] Japan .................................. 63-239531

[51] Int. Cl.$^5$ .......................... G02B 6/38; C03B 25/00; H05B 7/18
[52] U.S. Cl. ................................ 350/96.21; 350/96.33; 350/96.34; 350/320; 65/4.2; 65/12; 219/384; 219/121.2; 219/411
[58] Field of Search ............... 350/96.20, 96.21, 96.22, 350/320, 96.33, 96.30, 96.34; 427/163; 219/121.19, 121.2, 121.41, 121.47, 121.69, 383, 384, 409, 411; 65/4.1, 4.2, 3.1, 3.11, 12, 36

[56] References Cited

U.S. PATENT DOCUMENTS

| | | | |
|---|---|---|---|
| 4,183,621 | 1/1980 | Kao et al. | 350/96.30 |
| 4,475,935 | 10/1984 | Tanaka et al. | 65/3.41 |
| 4,512,629 | 4/1985 | Hanson et al. | 350/96.30 |
| 4,727,237 | 2/1988 | Schantz | 350/96.21 X |
| 4,957,343 | 9/1990 | Sato et al. | 350/96.21 |
| 4,962,988 | 10/1990 | Swann | 350/320 X |
| 4,964,694 | 10/1990 | Oohashi et al. | 350/96.33 |

FOREIGN PATENT DOCUMENTS 0292146 11/1988 European Pat. Off. ..... 350/96.30 X

*Primary Examiner*—Brian Healy
*Attorney, Agent, or Firm*—Cushman, Darby & Cushman

[57] ABSTRACT

A process for fusion-splicing hermetically coated optical fibers each of which comprises an inorganic coating, an optical fiber glass and optionally an organic coating, which process comprises removing the inorganic coating, fusion-splicing the fibers and then coating a portion where the inorganic coating is removed with an inorganic material.

6 Claims, 3 Drawing Sheets

PROCESS FOR FUSION-SPLICING HERMETICALLY COATED OPTICAL FIBERS

BACKGROUND OF THE INVENTION

1. Field of the Invention

The present invention relates to a process for fusion-splicing hermetically coated optical fibers each of which has an inorganic coating between an optical fiber glass and an organic coating for protection of the optical fiber.

2. Description of the Related Art

In a certain optical communication field, it is necessary to use optical fibers longer than one kilometer. When such the long optical fiber is used, a technical problem resides in that the fiber does not have a satisfactory mechanical strength. The long optical fiber usually used has a tensile strength in the range of from 50,000 to 80,000 p.s.i. However, in a particular application such as a rapid payment communication system where long optical fibers are used, the optical fiber, as a light waveguide, is required to have the tensile strength more than 200,000 p.s.i.

It is observed that the optical fiber made of silicon oxide material typically has the tensile strength in the order of one million p.s.i., when it is ideally drawn. However, the long optical fiber with such the sufficient mechanical strength cannot be practically produced since there are cracks of submicron scale on the surface of the fiber due to mechanical friction and chemical attack with a contaminant such as steam in an atmosphere during and after usual drawing of the optical fiber. In order to overcome this problem, an organic coating is formed around the optical fiber glass after the drawing thereof.

However, such the organic coating cannot prevent diffusion of steam or hydroxyl ions through the coating, which reduces the strength of the optical fiber coated with the organic material during operation or storage. Then, the optical fiber is very sensitive to steam and other harmful circumstances. Therefore, in order to protect the complete configuration of the optical fiber, a hermetic coating is provided thereon.

When the optical fiber is coated with an inorganic material such as silicone or a metal, one of the most practical methods conventionally applied is Chemical Vapor Deposition (CVD) method. In the CVD method, the coating material is produced in a gas phase through a reaction of single gaseous reactant at a temperature required to produce the coating, or with a reaction of more than two gaseous reactants at a preselected temperature.

However, such the hermetic coating prevents occurrence of the crack due to the contaminant from the outside and dose not improve the strength of the optical fiber. Then, there remains a possibility of breakage of the optical fiber. When the optical fiber breaks, it can be repaired by fusion-splicing. However, the optical fiber glass remains bare in the spliced portion It is clear that the strength of the bare portion is less than that of the other portion in which the hermetic coating is provided Generally, the strength of the fusion-spliced portion of the optical fiber is less than that of the other portion. For example, in the case of the fusion-splicing with arcing as shown in FIG. 1, it is known that the fused portion (4) has the least strength and that the breakage arises at such the portion. In FIG. 1, (1') indicates an optical fiber, (11) does an optical fiber glass, (2) does an arcing electrode rod and (3) does an arc.

Thus, the fusion-spliced portion of the optical fiber following has four problems:

1. The strength of the optical fiber glass is reduced due to the fusion;
2. With the fusion-spliced portion of the hermetically coated optical fiber, fragments of the hermetic coating material scattered by the arcing remain on the fused portion, which reduces the strength of the spliced portion;
3. No hermetic coating is provided around the fusion-spliced portion; and
4. A side observation method cannot be applied since the hermetic coating prevents the observation.

The problem (1) can be overcome by, for example, re-heating after the fusion-splicing (see Japanese Patent Kokai Publication No. 52011/1980), fusion-splicing in a low moisture atmosphere (see Japanese Patent Kokai Publication No. 220113/1983) or surface treating before the fusion-splicing (see Japanese Patent Kokai Publication No. 42011/1983). Although, in order to overcome the problem (3), a rigid coating (see Japanese Patent Kokai Publication No. 205407/1985) or a metal coating (see Japanese Patent Kokai Publication No. 107007/1985), respectively after the fusion-splicing have been proposed, neither is satisfactory. Further, the problems (2) and (4) have not been overcome.

SUMMARY OF THE INVENTION

It is, therefore, an object of the present invention to overcome the above problems (2), (3) and (4) in order to maintain the strength of a hermetically coated optical fiber at a fusion-spliced portion and to reduce a splice loss.

In the present invention, the hermetically coated optical fiber comprises an inorganic coating around an optical fiber glass. The optical fiber may further comprise an organic coating around the inorganic coating.

According to the present invention, there is provided a process to overcome the above problems, which process is characterized in that an inorganic material on a portion of each optical fiber to be fusion-spliced is removed, said portions are fusion-spliced, and they are newly coated with an inorganic material.

DETAILED DESCRIPTION OF THE INVENTION

The process for fusion-splicing according to the present invention will be described in detail with reference to FIGS. 2A to 2E.

Figure 2A:
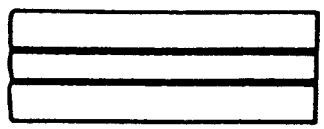
FIGS. 2A to 2E and FIGS. 3A to 3F show procedures of embodiments of the process for fusion-splicing hermetically coated optical fibers according to the present invention, FIG. 4 schematically shows one embodiment of an apparatus with which the process for fusion-splicing according to the present invention can be carried out.
Figure 2A:
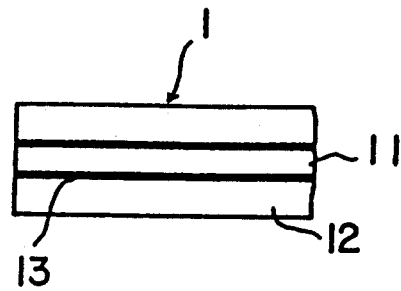
Figure 2B:
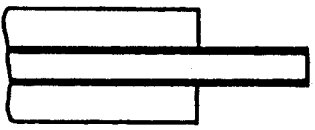
Figure 2B:
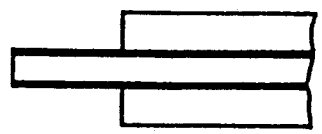

1. An organic coating (12) on an end portion of each hermetically coated optical fiber (1) as shown in FIG. 2A to be spliced is removed so that an inorganic coating (13) is exposed as shown in FIG. 2B, and end surfaces of the fiber glasses are faced each other.

Figure 2C:
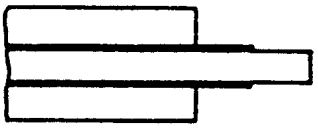
Figure 2C:
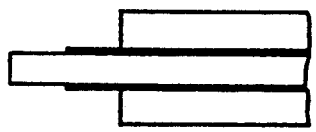
Figure 2D:
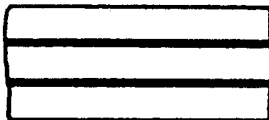
Figure 2D:
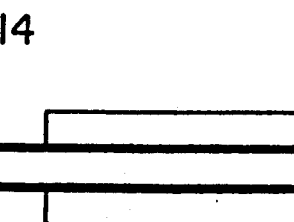

2. As shown in FIG. 2C, each exposed inorganic coating of the end portion is removed by, for example, weak arcing to expose an optical fiber glass (11).

3. The end surfaces of the optical fiber glasses (11) are faced each other, and the optical fibers are aligned with, for example, a side observation method. Then, after butting the end surfaces, fusion-splicing is carried out by heating with stronger arcing than in the case of the removal of the inorganic coating (see FIG. 2D).

Figure 2E:
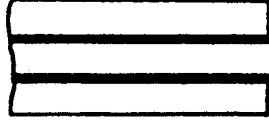
Figure 2E:
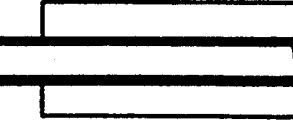

4. A portion (14) around which no inorganic coating is present is newly coated with an inorganic material (15) as shown in FIG. 2E.

Another embodiment of the process for fusion-splicing according to the present invention will be described with reference to FIGS. 3A to 3F.

Figure 3A:
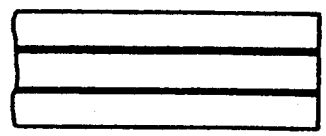
Figure 3A:
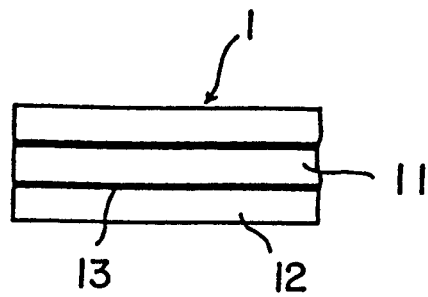
Figure 3B:
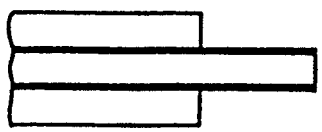
Figure 3B:
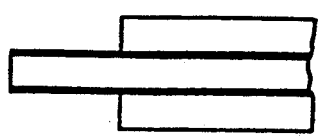

1. As in the first embodiment described above, an organic coating (12) of an end portion of each hermetically coated optical fiber (1) as shown in FIG. 3A to be spliced is removed so that an inorganic coating (13) is exposed as shown in FIG. 3B, and end surfaces of the fiber glasses are faced each other.

Figure 3C:
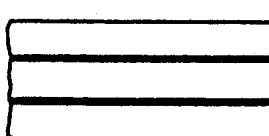
Figure 3C:
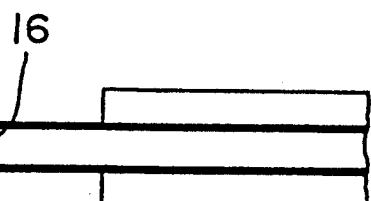
Figure 3D:
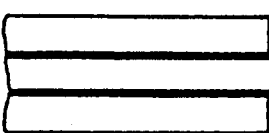
Figure 3D:
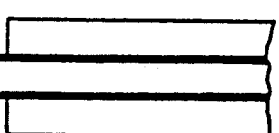
Figure 3E:
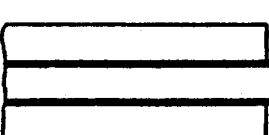
Figure 3E:
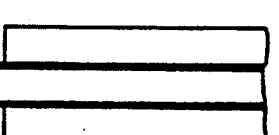

2. As shown in FIG. 3C, the optical fibers (11) coated with the inorganic material (13) are aligned with a power monitoring method and the end surfaces are butted together (16).

3. In the butted condition, the inorganic coating (13) in the vicinity of the butted portions is removed with the weak arcing to expose the optical fiber glass (11) (see FIG. 3D), and then the fusion-splicing is carried out by the arcing with increasing the power of the arcing (see FIG. 3E).

Figure 3F:
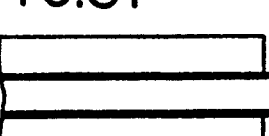
Figure 3F:
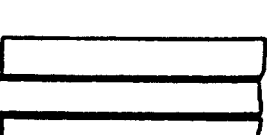

4. A portion (14) around which no inorganic coating is present is newly coated with the inorganic material (15) as shown in FIG. 3F.

Water which is deposited on the surface of the optical fiber glass most greatly affects the breakage of the optical fiber. In the case of the fusion-splicing, a lot of water in the air is deposited on the optical fiber glass in the step from heating operation (fusion operation of the optical fiber glass) to cooling operation.

In addition, the deposition of water on the optical fiber glass occurs with time during usual operation of the optical fiber. With respect to the hermetically coated optical fiber, it is difficult for water to be deposited on the surface of the optical fiber due to the configuration of the fiber. However, at the portion of the optical fiber glass from which the coating is removed, the fiber glass is exposed, and deposition of water occurs there when the portion is left with no coating.

Then, in order to avoid the influence of water in the fusion-spliced portion of the hermetically coated optical fiber, following requirements should be satisfied:

1. During the fusion-splicing, water is not deposited,
2. After the fusion-splicing, water is not disposed, and
3. A large-scaled apparatus is not necessary since the fusion-splicing operation should be carried out in any case.

In order to satisfy the second requirement, it can be conceived to newly coat the portion with no inorganic coating with an inorganic material after the fusion-splicing.

According to the present invention, the preferable inorganic material for the new inorganic coating is at least one material selected from the group consisting of carbon, silicon, aluminum, tin, antimony, silicon carbide, titanium carbide, titanium nitride ($Ti_3N_4$) and silicon nitride ($Si_3N_4$). The most preferable inorganic material is carbon.

When carbon is used as the inorganic material, the following effects can be obtained:

(i) Since the carbon coating is usually made by heat or plasma CVD, heat treatment or plasma etching is carried out at the same time so that a lot of water can be removed which is deposited on the optical fiber glass during the fusion-splicing, which satisfies the above first requirement; and (ii) When the carbon is coated by heat CVD, no large-scaled apparatus is necessary since high vacuum is not required. Further as the reactant gas, for example, methane or propane can be used which is highly pure and cheap. When such the gas is used, the rate of forming the coating is high so that coating time can be reduced. Therefore, a coating can be formed cheaply.

The carbon coating can be also formed with a flame of a gas containing carbon and in such case, the same effects as described above can be obtained.

Figure 1:
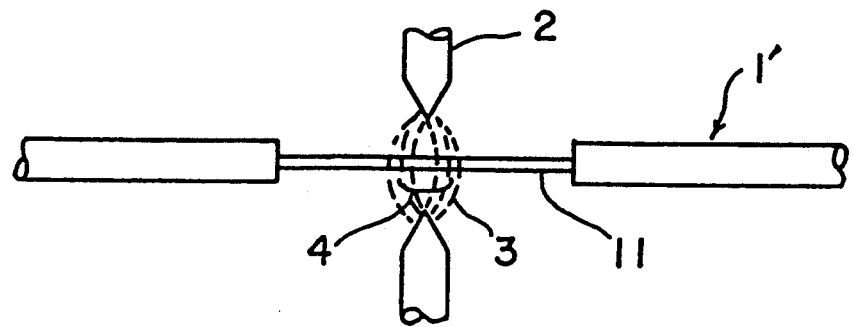
FIG. 1 shows a process for conventionally fusion-splicing the optical fibers.
Figure 4:
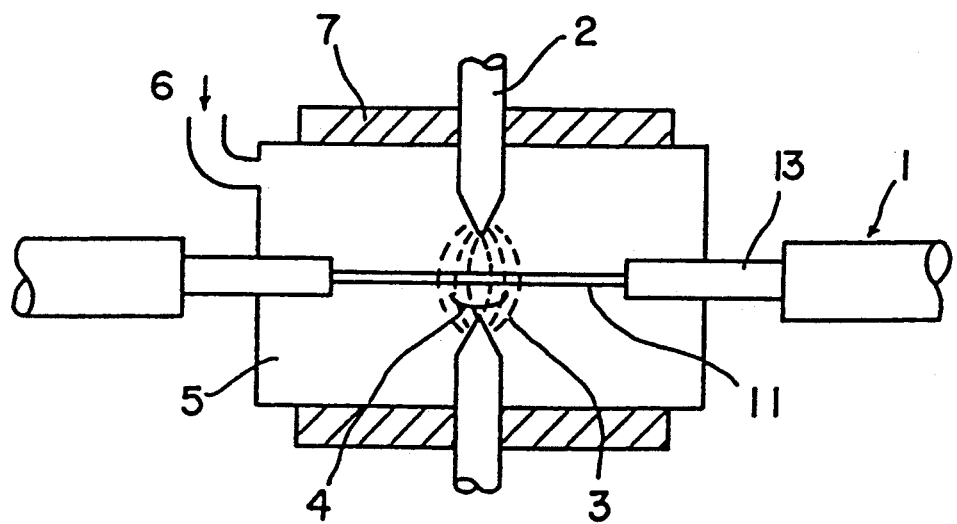

FIG. 4 schematically shows one embodiment of the apparatus with which the process for fusion-splicing according to the present invention can be carried out. The apparatus comprises a pair of arcing electrode rods (2), a reaction tube (5), a gas inlet (6) for the reactant gas and an electric furnace (7). The optical fibers each comprising the fiber glass (11) with the inorganic coating (13) are disposed in the apparatus. The numerical numbers (3) and (4) indicate arc and the fusion-spliced portions, respectively.

The present invention will be hereinafter described with examples.

EXAMPLE 1

The hermetically coated optical fibers to be fusion-spliced were aluminum coated fibers each having a core diameter of 50 $\mu$m, a fiber glass diameter of 125 $\mu$m and an aluminum coating diameter of 250 $\mu$m.

The end portion of each fiber was immersed in 5% by weight NaOH aqueous solution for about one hour to remove the aluminum coating of the end portion of the optical fiber. After the exposed portions of the optical fiber glass were washed with an organic solvent, the end surfaces of the two optical fibers were opposed with butting one another, and then they were fixed together in the butted condition.

A voltage was applied across a pair of arcing electrode rods which were disposed to intersect at right angle relative to the butted fibers so that arcing heated the butted portions, whereby the portions were heated by arcing and fusion-spliced. The fusion-spliced portion was disposed in a glass chamber equipped with a heater. The chamber was heated to 800° C., a small amount of gaseous propane was supplied in the chamber and then the heating was continued for further ten minutes. A carbon coating was formed well around the exposed fused portion of the optical fibers. The carbon coating was about 2000 Å in thickness.

The tensile strength of the spliced portion was measured with 20 pairs of the optical fibers which were fusion-spliced according to the above procedure. An average tensile strength of the spliced portions was 80 kg/mm$^2$.

For comparison, the optical fibers were fusion-spliced by means of the conventional process. The tensile strength of the spliced portion was measured with 20 pairs of the optical fibers. The average tensile strength of the spliced portion was 42 kg/mm$^2$.

When the fusion-spliced portion was exposed to $H_2$ atmosphere at 1 atm at room temperature for a week, no light absorption due to $H_2$ was observed.

EXAMPLE 2

The hermetically coated optical fibers to be fusion-spliced were carbon coated optical fibers each having a core diameter of 10 μm, an optical fiber glass diameter of 125 μm and a carbon coating of about 1000 Å in thickness.

An organic coating of the end portion of each optical fiber was removed. The end portions of the two optical fibers with the carbon coating were washed with the organic solvent, and then the end surfaces of the fibers were opposed for alignment and fixed together in the butted condition.

The end portions of the fibers were heated with weak arcing to remove the carbon coating in the vicinity of the end portions. A voltage was applied across a pair of arcing electrode rods which were disposed to intersect at a right angle relative to the butted portions of the optical fibers, whereby the portions were heated by arcing and fusion-spliced. The fusion-spliced portion was disposed in a flame generated from a gas consisting of benzene ($C_6H_6$) and oxygen ($O_2$). The flow ratio of benzene to oxygen was about four. The carbon coating was formed very well around the fusion-spliced portion of the optical fiber glass. The carbon coating was about 2000 Å in thickness.

The tensile strength of the fusion-spliced portion was measured with 20 pairs of the optical fibers spliced according to the above procedure. The average tensile strength of the spliced portions was 80 kg/mm$^2$.

When the fusion-spliced portion was exposed to $H_2$ atmosphere at 1 atm at room temperature for a week, no light absorption due to $H_2$ was observed.

EXAMPLE 3

The hermetically coated optical fibers to be fusion-spliced were carbon coated fibers each having a core diameter of 8 μm, an optical fiber glass diameter of 125 μm and a carbon coating of about 400 Å in thickness.

An organic coating at the end portion of each optical fiber was removed with a remover, which can easily remove the organic coating mechanically. The end surfaces of two optical fibers were opposed and fixed in a fusion-splicer. At first, the end portions (2–3 mm in length) were heated to around 700° C. with a weak arcing in the atmosphere to remove the carbon coating with oxidation. The cores of two fibers were aligned by the side observation method so that the optical fibers were on the same straight line. Such the optical fibers were fusion-spliced by applying a voltage across a pair of arcing electrode rods which were disposed at a right angle relative to the spliced fibers.

Then, the fused portion was disposed in the glass chamber and heated to 800° C. with an infrared concentrating heater, and dimethyldichlorosilane ($SiCl_2(CH_3)_2$) was supplied in the chamber with Ar as a carrier. The portion was further heated for about five minutes. A coating of SiC (500 Å in thickness) was formed around the exposed portion of the fusion-spliced optical fiber glass.

The tensile strength of the spliced portion was measured with 20 pairs of the optical fibers fusion-spliced according to the above procedure. The average tensile strength at the spliced portions was 80 kg/mm$^2$.

Further, the fused portion was wound around a rod of 30 mm in diameter and kept standing for a month. Then, the fiber was wound off and the tensile strength of the spliced portion was measured to be 80 kg/mm$^2$ on an average.

EXAMPLE 4

The hermetically coated optical fibers were the same as those used in Example 3. The organic coating of the end portion of each fiber was removed and the end surfaces of the fibers were fixed in the splicer as in Example 3. The end portions of two fibers were disposed in the glass chamber and heated to 700° C. in the atmosphere by weak arcing so that the carbon coating at the end portion (2–3 mm in length) was removed with oxidation. The cores of the fibers were aligned as in Example 3. After the atmosphere inside of the chamber was replaced with Ar, such the optical fibers were fusion-spliced by applying a voltage across a pair of arcing electrode rods which were disposed to intersect at a right angle relative to the spliced fibers. Then, the spliced portion was sprayed with gaseous $C_2H_2$ before the portion was cooled down (at higher than 1000° C.).

The carbon coating (500 Å in thickness) was formed around the exposed portion of the fusion-spliced optical fiber glass.

The tensile strength of the spliced portion was measured with 20 pairs of the optical fibers fusion-spliced according to the above procedure. The average tensile strength at the spliced portions was 80 kg/mm$^2$.

Further, the fused portion was wound around a rod of 30 mm in diameter and kept standing for a month. Then, the fiber was wound off and the tensile strength of the spliced portion was measured to be 80 kg/mm$^2$ on an average.

As described above, according to the process of the present invention, it is possible to carry out the fusion-splicing with a very convenient procedure at a cheap cost in order to form the spliced portion having the satisfactory strength. Then, when the hermetically coated optical fiber is broken, it is possible to easily repair the fiber without the reduction of the strength by fusion-splicing.

What is claimed is:

1. A process for fusion-splicing hermetically coated optical fibers each of which comprises an inorganic coating around an optical fiber glass, which process comprises:
    (a) removing the inorganic coating by arcing;
    (b) fusion splicing the fibers; and
    (c) re-coating a portion of said fused fibers where the inorganic coating is removed with an inorganic material;
    wherein said re-coating step is accomplished with a heating means selected from the group consisting of a chamber heated with a heater, a flame of a gas containing a hydrocarbon, a chamber heated with an infrared concentrating heater and remaining heat during the fusion splicing step.

2. The process according to claim 1, in which each hermetically coated optical fiber further comprises an organic coating around the inorganic coating and which process comprises:
    (a) removing the organic coating;
    (b) removing the inorganic coating;
    (c) fusion splicing the fibers after alignment thereof; and (d) re-coating the portion of the spliced fiber where the inorganic coating is removed with the inorganic material.

3. The process according to claim 1, in which each hermetically coated optical fiber further comprises an organic coating around the inorganic coating and which process comprises:
   (a) removing the organic coating;
   (b) aligning and abutting the fibers;
   (c) removing the inorganic coating;
   (d) fusion splicing the fibers; and
   (e) re-coating the portion of the spliced fiber where the inorganic coating is removed with the inorganic material.

4. The process according to claim 1 in which the new inorganic coating is formed by heating the vicinity of the portion where the inorganic coating is removed and supplying a gas containing the inorganic material around the portion to deposit the inorganic material around the portion.

5. The process according to claim 1, in which the inorganic material is carbon.

6. The process according to claim 1, in which the removal of the inorganic coating is made by weak arcing and fusion-splicing is carried out by arcing stronger than the arcing during the removal of the inorganic coating.

* * * * *